United States Patent
Dickelman

(10) Patent No.: US 7,702,553 B1
(45) Date of Patent: Apr. 20, 2010

(54) SYSTEM AND METHOD FOR CONVERSION OF INITIAL TRANSACTION TO FINAL TRANSACTION

(75) Inventor: Mark Dickelman, Inverness, IL (US)

(73) Assignees: JP Morgan Chase Bank, N.A., New York, NY (US); U.S. Bancorp Licensing, Inc., Minneapolis, MN (US)

( * ) Notice: Subject to any disclaimer, the term of this patent is extended or adjusted under 35 U.S.C. 154(b) by 0 days.

(21) Appl. No.: 12/132,312

(22) Filed: Jun. 3, 2008

Related U.S. Application Data

(62) Division of application No. 10/975,465, filed on Oct. 29, 2004.

(51) Int. Cl.
*G06Q 40/00* (2006.01)
(52) U.S. Cl. ...................................................... 705/35
(58) Field of Classification Search ................ 705/1–45; 235/379, 380, 385; 358/1.15; 381/104; 701/16; 707/104.1
See application file for complete search history.

(56) References Cited

U.S. PATENT DOCUMENTS

| | | | |
|---|---|---|---|
| 3,653,480 | A | 4/1972 | Yamamoto et al. |
| 4,205,780 | A | 6/1980 | Burns et al. |
| 4,321,672 | A | 3/1982 | Braun et al. |
| 4,396,985 | A | 8/1983 | Ohara et al. |
| 4,495,018 | A | 1/1985 | Vohrer et al. |
| 4,617,457 | A | 10/1986 | Granzow et al. |
| 4,672,377 | A | 6/1987 | Murphy et al. |
| 4,700,055 | A | 10/1987 | Kashkashian, Jr. |
| 4,752,877 | A | 6/1988 | Roberts et al. |
| 4,797,913 | A | 1/1989 | Kaplan et al. |
| 4,799,156 | A | 1/1989 | Shavit et al. |

(Continued)

FOREIGN PATENT DOCUMENTS

EP 0099999 2/1984

(Continued)

OTHER PUBLICATIONS

Smart Cards and the Wireless Revolution, Card Technology, v1, n9, p. 44+, Oct. 2000.*

(Continued)

*Primary Examiner*—Mary Cheung
*Assistant Examiner*—Tien C Nguyen
(74) *Attorney, Agent, or Firm*—Goodwin Procter LLP

(57) ABSTRACT

The invention comprises a system and method for converting initial financial transactions into final financial transactions entailing lower transaction fees or which are otherwise more advantageous. According to one embodiment of the invention, a card not present (CNP) transaction is conducted for a remote consumer buying goods/services. When the consumer later arrives at a point of authentication (POA), the consumer is presented with an opportunity to have the CNP transaction effectively converted to a card present (CP) transaction using the same card instrument or a different card instrument. The merchant benefits because the transaction fees are much reduced for the CP transaction compared to the CNP transaction. The consumer may benefit from rewards/rebates or other inducements to authorizing the subsequent transaction. One preferred embodiment implements the invention in the airlines environment, wherein tickets ordered over the phone or on-line using a first CNP transaction are converted to a CP transaction when the consumer swipes his/her card at an airport kiosk card reader device.

7 Claims, 5 Drawing Sheets

U.S. PATENT DOCUMENTS

| | | | |
|---|---|---|---|
| 4,812,628 A | 3/1989 | Boston et al. | |
| 4,823,264 A | 4/1989 | Deming | |
| 4,931,793 A | 6/1990 | Fuhrmann et al. | |
| 4,948,174 A | 8/1990 | Thomson et al. | |
| 4,974,878 A | 12/1990 | Josephson | |
| 4,988,849 A | 1/1991 | Sasaki et al. | |
| 4,992,646 A | 2/1991 | Collin et al. | |
| 5,023,904 A | 6/1991 | Kaplan et al. | |
| 5,053,607 A | 10/1991 | Carlson et al. | |
| 5,054,096 A | 10/1991 | Beizer | |
| 5,080,748 A | 1/1992 | Bonomi | |
| 5,111,395 A | 5/1992 | Smith et al. | |
| 5,121,945 A | 6/1992 | Thomson et al. | |
| 5,122,950 A | 6/1992 | Benton et al. | |
| 5,136,502 A | 8/1992 | Van Remortel et al. | |
| 5,175,682 A | 12/1992 | Higashiyama et al. | |
| 5,198,975 A | 3/1993 | Baker et al. | |
| 5,220,501 A | 6/1993 | Lawlor et al. | |
| 5,225,978 A | 7/1993 | Petersen et al. | |
| 5,237,159 A | 8/1993 | Stephens et al. | |
| 5,237,620 A | 8/1993 | Deaton et al. | |
| 5,283,829 A | 2/1994 | Anderson | |
| 5,287,269 A | 2/1994 | Dorrough et al. | |
| 5,311,594 A | 5/1994 | Penzias | |
| 5,315,508 A | 5/1994 | Bain et al. | |
| 5,321,238 A | 6/1994 | Kamata et al. | |
| 5,326,959 A | 7/1994 | Perazza | |
| 5,336,870 A | 8/1994 | Hughes et al. | |
| 5,350,906 A | 9/1994 | Brody et al. | |
| 5,367,581 A | 11/1994 | Abel et al. | |
| 5,373,550 A | 12/1994 | Campbell et al. | |
| 5,396,417 A | 3/1995 | Burks et al. | |
| 5,402,474 A | 3/1995 | Miller et al. | |
| 5,412,190 A | 5/1995 | Josephson et al. | |
| 5,420,405 A | 5/1995 | Chasek | |
| 5,424,938 A | 6/1995 | Wagner et al. | |
| 5,430,644 A | 7/1995 | Deaton et al. | |
| 5,432,506 A | 7/1995 | Chapman | |
| 5,444,794 A | 8/1995 | Uhland, Sr. | |
| 5,444,841 A | 8/1995 | Glaser et al. | |
| 5,446,740 A | 8/1995 | Yien et al. | |
| 5,448,471 A | 9/1995 | Deaton et al. | |
| 5,465,206 A | 11/1995 | Hilt et al. | |
| 5,477,040 A | 12/1995 | Lalonde | |
| 5,479,494 A | 12/1995 | Clitherow | |
| 5,479,532 A | 12/1995 | Abel et al. | |
| 5,483,445 A | 1/1996 | Pickering | |
| 5,484,988 A | 1/1996 | Hills et al. | |
| 5,502,576 A | 3/1996 | Ramsay et al. | |
| 5,504,677 A | 4/1996 | Pollin | |
| 5,506,691 A | 4/1996 | Bednar et al. | |
| 5,513,250 A | 4/1996 | McAllister | |
| 5,532,464 A | 7/1996 | Josephson et al. | |
| 5,537,314 A | 7/1996 | Kanter | |
| 5,544,040 A | 8/1996 | Gerbaulet et al. | |
| 5,544,046 A | 8/1996 | Niwa et al. | |
| 5,550,734 A | 8/1996 | Tarter et al. | |
| 5,551,021 A | 8/1996 | Harada et al. | |
| 5,557,515 A | 9/1996 | Abbruzzese et al. | |
| 5,563,400 A | 10/1996 | Le Roux et al. | |
| 5,566,330 A | 10/1996 | Sheffield | |
| 5,568,489 A | 10/1996 | Yien et al. | |
| 5,570,465 A | 10/1996 | Tsakanikas | |
| 5,572,004 A | 11/1996 | Raimann et al. | |
| 5,583,759 A | 12/1996 | Geer | |
| 5,583,760 A | 12/1996 | Klesse | |
| 5,590,196 A | 12/1996 | Moreau et al. | |
| 5,590,197 A | 12/1996 | Chen et al. | |
| 5,592,377 A | 1/1997 | Lipkin | |
| 5,592,378 A | 1/1997 | Cameron et al. | |
| 5,599,528 A | 2/1997 | Igaki et al. | |
| 5,603,025 A | 2/1997 | Tabb et al. | |
| 5,615,109 A | 3/1997 | Eder | |
| 5,621,201 A | 4/1997 | Langhans et al. | |
| 5,640,577 A | 6/1997 | Scharmer | |
| 5,642,419 A | 6/1997 | Rosen | |
| 5,649,117 A | 7/1997 | Landry | |
| 5,652,786 A | 7/1997 | Rogers | |
| 5,659,165 A | 8/1997 | Jennings et al. | |
| 5,659,469 A | 8/1997 | Deaton et al. | |
| 5,666,493 A | 9/1997 | Wojcik et al. | |
| 5,677,955 A | 10/1997 | Doggett et al. | |
| 5,679,938 A | 10/1997 | Templeton et al. | |
| 5,679,940 A | 10/1997 | Templeton et al. | |
| 5,692,132 A | 11/1997 | Hogan | |
| 5,699,528 A | 12/1997 | Hogan | |
| 5,703,344 A | 12/1997 | Bezy et al. | |
| 5,704,044 A | 12/1997 | Tarter et al. | |
| 5,708,422 A | 1/1998 | Blonder et al. | |
| 5,710,889 A | 1/1998 | Clark et al. | |
| 5,715,298 A | 2/1998 | Rogers | |
| 5,715,314 A | 2/1998 | Payne et al. | |
| 5,715,399 A | 2/1998 | Bezos | |
| 5,717,989 A | 2/1998 | Tozzoli et al. | |
| 5,724,424 A | 3/1998 | Gifford | |
| 5,727,249 A | 3/1998 | Pollin | |
| 5,732,398 A * | 3/1998 | Tagawa | 705/5 |
| 5,748,780 A | 5/1998 | Stolfo | |
| 5,751,842 A | 5/1998 | Riach et al. | |
| 5,757,917 A | 5/1998 | Rose et al. | |
| 5,770,843 A | 6/1998 | Rose et al. | |
| 5,774,553 A | 6/1998 | Rosen | |
| 5,784,696 A | 7/1998 | Melnikoff | |
| 5,793,861 A | 8/1998 | Haigh | |
| 5,794,221 A | 8/1998 | Egendorf | |
| 5,797,127 A * | 8/1998 | Walker et al. | 705/5 |
| 5,802,498 A | 9/1998 | Comesanas | |
| 5,802,499 A | 9/1998 | Sampson et al. | |
| 5,819,236 A | 10/1998 | Josephson | |
| 5,819,238 A | 10/1998 | Fernholz | |
| 5,823,463 A | 10/1998 | Fissmann et al. | |
| 5,823,464 A | 10/1998 | Bohn et al. | |
| 5,826,241 A | 10/1998 | Stein et al. | |
| 5,826,245 A | 10/1998 | Sandberg-Diment | |
| 5,832,447 A | 11/1998 | Rieker et al. | |
| 5,832,460 A | 11/1998 | Bednar et al. | |
| 5,832,463 A | 11/1998 | Funk | |
| 5,832,464 A | 11/1998 | Houvener et al. | |
| 5,835,580 A | 11/1998 | Fraser | |
| 5,835,603 A | 11/1998 | Coutts et al. | |
| 5,835,899 A | 11/1998 | Rose et al. | |
| 5,852,812 A | 12/1998 | Reeder | |
| 5,859,419 A | 1/1999 | Wynn | |
| 5,864,609 A | 1/1999 | Cross et al. | |
| 5,870,456 A | 2/1999 | Rogers | |
| 5,870,721 A | 2/1999 | Norris | |
| 5,870,723 A | 2/1999 | Pare, Jr. et al. | |
| 5,870,725 A | 2/1999 | Bellinger et al. | |
| 5,873,072 A | 2/1999 | Kight et al. | |
| 5,883,810 A | 3/1999 | Franklin et al. | |
| 5,884,288 A | 3/1999 | Chang et al. | |
| 5,897,625 A | 4/1999 | Gustin et al. | |
| 5,898,157 A | 4/1999 | Mangili et al. | |
| 5,910,896 A | 6/1999 | Hahn-Carlson | |
| 5,917,965 A | 6/1999 | Cahill et al. | |
| 5,956,700 A | 9/1999 | Landry | |
| 5,963,292 A | 10/1999 | Rivir et al. | |
| 5,963,659 A | 10/1999 | Cahill et al. | |
| 5,963,925 A | 10/1999 | Kolling et al. | |
| 5,987,435 A | 11/1999 | Weiss et al. | |
| 5,987,436 A | 11/1999 | Halbrook | |
| 5,987,439 A | 11/1999 | Gustin et al. | |
| 5,991,750 A | 11/1999 | Watson | |
| 6,000,832 A | 12/1999 | Franklin et al. | |

| | | |
|---|---|---|
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,032,133 A | 2/2000 | Hilt et al. |
| 6,032,137 A | 2/2000 | Ballard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,052,674 A | 4/2000 | Zervides et al. |
| 6,058,380 A | 5/2000 | Anderson et al. |
| 6,058,381 A | 5/2000 | Nelson et al. |
| 6,061,665 A | 5/2000 | Bahreman |
| 6,065,675 A | 5/2000 | Teicher et al. |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,381 A | 7/2000 | Myers, Jr. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,094,640 A * | 7/2000 | Goheen .................. 705/5 |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura et al. |
| 6,148,293 A | 11/2000 | King |
| 6,149,056 A | 11/2000 | Stinson et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,227,447 B1 | 5/2001 | Campisano |
| 6,233,566 B1 | 5/2001 | Levine et al. |
| 6,236,972 B1 | 5/2001 | Shkedy |
| 6,278,981 B1 | 8/2001 | Dembo et al. |
| 6,289,322 B1 | 9/2001 | Kitchen et al. |
| 6,301,379 B1 | 10/2001 | Thompson et al. |
| 6,304,858 B1 | 10/2001 | Mosler et al. |
| 6,321,212 B1 | 11/2001 | Lange |
| 6,338,047 B1 | 1/2002 | Wallman |
| 6,338,049 B1 | 1/2002 | Walker et al. |
| 6,374,235 B1 | 4/2002 | Chen et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,490,568 B1 | 12/2002 | O'Mara et al. |
| 6,493,685 B1 | 12/2002 | Ensel et al. |
| 6,574,377 B1 | 6/2003 | Cahill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,615,189 B1 | 9/2003 | Phillips et al. |
| 6,704,714 B1 | 3/2004 | O'Leary et al. |
| 6,721,715 B2 | 4/2004 | Nemzow |
| 6,910,628 B1 * | 6/2005 | Sehr .................. 235/384 |
| 7,104,443 B1 | 9/2006 | Paul et al. |
| 2001/0016825 A1 * | 8/2001 | Pugliese et al. .................. 705/5 |
| 2001/0018639 A1 | 8/2001 | Bunn |
| 2001/0018739 A1 | 8/2001 | Anderson et al. |
| 2001/0037250 A1 | 11/2001 | Lefkowitz |
| 2001/0037309 A1 | 11/2001 | Vrain |
| 2001/0047334 A1 | 11/2001 | Nappe et al. |
| 2001/0047489 A1 | 11/2001 | Ito et al. |
| 2001/0049628 A1 | 12/2001 | Icho |
| 2001/0049636 A1 | 12/2001 | Hudda et al. |
| 2002/0012445 A1 | 1/2002 | Perry |
| 2002/0013728 A1 | 1/2002 | Wilkman |
| 2002/0026394 A1 | 2/2002 | Savage et al. |
| 2002/0038363 A1 | 3/2002 | MacLean |
| 2002/0052842 A1 | 5/2002 | Schuba et al. |
| 2002/0069134 A1 | 6/2002 | Solomon |
| 2002/0077978 A1 | 6/2002 | O'Leary et al. |
| 2002/0087468 A1 | 7/2002 | Ganesan et al. |
| 2002/0091635 A1 | 7/2002 | Dilip et al. |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0133467 A1 | 9/2002 | Hobson et al. |
| 2002/0138398 A1 | 9/2002 | Kalin et al. |
| 2002/0170966 A1 | 11/2002 | Hannigan et al. |
| 2002/0198817 A1 | 12/2002 | Dhir |
| 2002/0199182 A1 | 12/2002 | Whitehead |
| 2003/0004886 A1 * | 1/2003 | Chandar et al. .................. 705/52 |
| 2003/0018557 A1 | 1/2003 | Gilbert et al. |
| 2003/0046218 A1 | 3/2003 | Albanese et al. |
| 2003/0055689 A1 * | 3/2003 | Block et al. .................. 705/5 |
| 2003/0097335 A1 | 5/2003 | Moskowitz et al. |
| 2003/0105641 A1 | 6/2003 | Lewis |
| 2003/0149632 A1 | 8/2003 | Walker et al. |
| 2003/0208421 A1 | 11/2003 | Vicknair et al. |
| 2003/0208441 A1 | 11/2003 | Poplawski et al. |
| 2003/0220841 A1 * | 11/2003 | Maritzen .................. 705/26 |
| 2003/0225663 A1 | 12/2003 | Horan et al. |
| 2003/0229523 A1 * | 12/2003 | Goldstein .................. 705/5 |
| 2003/0233305 A1 | 12/2003 | Solomon |
| 2004/0019564 A1 * | 1/2004 | Goldthwaite et al. .......... 705/44 |
| 2004/0030647 A1 * | 2/2004 | Hansen et al. .................. 705/40 |
| 2004/0050928 A1 | 3/2004 | Bishop et al. |
| 2004/0078328 A1 | 4/2004 | Talbert et al. |
| 2004/0083183 A1 * | 4/2004 | Hardesty et al. .............. 705/65 |
| 2004/0122736 A1 | 6/2004 | Strock et al. |
| 2004/0210476 A1 * | 10/2004 | Blair et al. .................. 705/13 |
| 2005/0021400 A1 | 1/2005 | Postrel |
| 2005/0033690 A1 | 2/2005 | Antognini et al. |

FOREIGN PATENT DOCUMENTS

| | | |
|---|---|---|
| EP | 421808 | 4/1991 |
| EP | 1014318 | 6/2000 |
| WO | WO 91/16691 | 10/1991 |
| WO | WO 93/08545 | 4/1993 |
| WO | WO-9428497 | 12/1994 |
| WO | WO 96/08783 | 3/1996 |
| WO | WO-9745796 | 12/1997 |
| WO | WO-9745814 | 12/1997 |
| WO | WO-9809260 | 3/1998 |
| WO | WO-9910823 | 3/1999 |
| WO | WO 02/063432 | 8/2002 |

OTHER PUBLICATIONS

A study of airline's online reservation services on the Internet, Journal of Travel Research v39n2 pp. 202-211.*

Towards getting more locals to shop online, Aimie Pardas, Computimes (Malaysia), Sep. 12, 2002.*

Visa & Carnegie Mellon Plan Online Payment Scheme, Newsbyte News Network, Feb. 15, 1995, 2 pages.

Priya, Malhortra, "Clearing HOuse Enumerates e-Payments Ills," American Banker The Financial Services Daily, Tuesday, Aug. 13, 2002, 2 pages.

Financial News, "Wells Fargo Rolls Out Nationwide Lockbox Check Conversion," PR Newswire Association, Apr. 22, 2003, 2 pages.

Business Wire, Jan. 15, 1996, CES/NaBANCO introduces stored value card technology; blockbuster video is first merchant partner, 2 pages.

Melinda Norris, et al., Omaha World Herald, Jan. 19, 1996, Sunrise Edition, First data unit develops blockbuster cash card, 2 pages.

Valerie Block, The American Banker, Sep. 1, 1995. Blockbuster running test of a stored value card, 2 pages.

Wall Street Journal Nov. 7, 2002, Fidelity Helps Fund Sellers Trim the Taxes They'll Owe, 2 pages.

Harsh Trush: Your Investments Likely Won't Make Any Money, 2 pages.

Erica Goode, The New York Times, Nov. 5, 2002. On Profit, Loss and the Mysteries of the Mind, 4 Pages.

PNCBank, Today's Issues in Treasury Management, Payor's Prescription for Painless Migration to Electronic Healthcare Payments and Remittance Advices, www.treasury.pncbank.com, 6 pages.

PNCBank, Today's Issues in Treasury Management, Provider's Prescription for Painless Migration to Receipt of Electronic Healthcare Payments and Remittance Advices, www.treasury.pncbank.com, 8 pages.

Gregory Zuckerman, The Wall Street Journal Online, Jun. 12, 2002, The Hedge-Fund Craze, 17 pages.

Ian McDonald, The Stars in the Sky Flicker, and Fund Stars Do the Same, 3 pages.

Card Flash Daily Payment Card News, Sep. 23, 2004, CardWeb.com Inc., 3 pages.

Annual Report Pursuant to Section 13 or 15(d) of The Securities Exchange Act of 1934, Form 10-k, Intelidata Technologies Corporation, Fiscal Year Ended Dec. 31, 2001.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest document ID 8723558, ISSn/ISBN: 10459472, Nov. 1995.

Anonymous, Chasing the global trend, Cash Management News, ProQuest document ID 9319923, ISSN: 02686635, Dec. 1995.

Marjanovic, Corporate Services: chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Keith, Credit Card Transaction Real World and Online, http://www.virtualschool.edu/mon/ElectronicProperty/Klamond/credit_card.htm, pp. 1-17, printed Jul. 8, 2005.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street, Journal, Nov. 7, 2002.

Money, Initial Launch to 200 Credit Unions, USA Today.com, Jun. 27, 2002.

Decovny, Net Scopt, Banking Jechnology, May 1997.

Nokia Announces the World's First NFC Enabled Mobile Product for Contactless Payment and Ticketing, PRNewswire, Feb. 9, 2005.

Annonymous, Operating in a multi-currency environment, ProQuest document ID 9215937. ISSN/ISBN 09589309, Oct. 1995.

Payment data, www.paymentdata.com, Mar. 5, 2004.

Press Release, Mar. 5, 2004, Payment Data Systems Files Patent on Debit Card Payment Solution, american City Business Journals, Inc., Mar. 5, 2004.

Anonymous, Systems spell change for foreign exchange, Global Investor, ProQuest document ID 1056152B, ISSN/ISBN: 09513604, Nov. 1996.

French, Tech Stocks; Market Movers, Investors Worry CheckFree Being Chased from its Own Game, http://www.thestreet.com, Jun. 20, 2002.

Technology, In Brief Wachovia-InteliData Deal, May 7, 2002.

* cited by examiner

SYSTEM AND METHOD FOR CONVERSION OF INITIAL TRANSACTION TO FINAL TRANSACTION

CROSS-REFERENCE TO RELATED APPLICATIONS

This application is a divisional of U.S. patent application Ser. No. 10/975,465 entitled: "System and Method For Conversion of Initial Transaction To Final Transaction," filed on Oct. 29, 2004 which claims priority under 35 U.S.C. §119 to Provisional Patent Application No. 60/517,402, filed on Nov. 6, 2003, the disclosures of each of which are incorporated by reference herein in their entireties.

FIELD OF THE INVENTION

The present invention relates generally to payment processing, and more particularly, to a payment processing system and method providing for effectively converting an initial type of financial transaction into a more advantageous final type of financial transaction.

BACKGROUND OF THE INVENTION

In the modern "plastic economy," consumers are using their credit cards and other card instruments and other payment methods for purchasing goods and services in place of conventional purchase methods, such as cash and checks. Consumers have determined that the convenience, deferred payment, transaction tracking (e.g., itemized statements), and dispute (e.g., chargebacks) features make such card instruments a much superior payment mechanism. Likewise, corporations provide corporate credit cards (or other card payment instruments or payment methods) for travel and other business related purposes.

Merchants benefit from the increased usage of card instruments because their sales volume greatly increases. Consumers tend to make fewer purchases when cash at hand is required. Checks can be unwieldy for the consumer and, from the merchant's standpoint, can be less dependable payment sources. As a result, in the modern economy the vast majority of merchants accept card instruments of various types as payment.

As used herein, "card instruments" relates to the various financial accounts that a consumer can use for paying for goods and services. In most, but not all cases, there will be a physical card associated with the account, although in some instances a virtual card, or no card at all, may be associated with the financial account. Card instruments include, but are not necessarily limited to, credit cards (e.g., including general use or private label credit cards), ATM cards, debit cards, check cards, bank cards, stored value cards, and similar products. Card instruments may be embodied by conventional thin plastic (or other material) cards having embossings and magnetic stripe data, as well as so-called "smart cards" or similar devices having processor components and/or readable/writeable memory. Card instruments may comprise various types of so-called "contactless" cards, such as RFID (radio frequency identification) cards, optically-readable cards or other types of cards or tokens which read without physical contact with a reader device.

One disadvantage to merchants accepting card instruments for payment is that typically transaction fees must be paid. For example, card instruments linked to national interchange networks (e.g., the VISA® interchange, MasterCard® interchange, and the like) impose transaction fees on the merchant each time the card is used. Usually, the transaction fee (or a component of the total transaction fee) is imposed as a percentage of the money amount being charged to or debited from the card, although other arrangements such as volume-based transaction fee arrangements may be employed.

Card instruments may also be linked to networks other than the national interchange networks. For example, bank cards, ATM cards, debit cards, and check cards may be linked to regional electronic funds transfer (EFT) networks, ATM networks, or similar regional networks. Merchants tend to favor cards which run transactions over such regional networks because the transaction fees are generally lower than for the national interchanges.

Card instruments may also be linked to processing networks other than national interchange networks and regional networks, such as stored value networks, private label networks, or other transaction networks. A stored value network may be employed as a dedicated network for running stored value transactions (e.g., a SuperFood™ stored value card for grocery shopping). A private label network may be employed for running transactions for private label cards (e.g., Hechts™ card or Nordstrom's™ card).

In sum, there are a variety of card instrument products that merchants can accept for payment. Transactions using most card instruments entail transaction fees that the merchant must pay. With such a large volume of consumer transactions involving card instruments these days, this means that merchants are paying substantial sums of money in transaction fees.

One type of transaction where merchants are paying substantially higher transaction fees involves what is known as "Card Not Present" (CNP) transactions, sometimes referred to as "non-swipe" transactions. CNP transactions are submitted when the consumer is not at a point of authentication (POA) where the physical card can be presented and read by a reader (or otherwise physically inspected). Typically, CNP transactions impose significantly higher transaction lees based on a "base rate" component of the transaction fee that increases on the order of basis points from the base rate component for a conventional "Card Present" (CP) transaction, where the card is swiped or read or otherwise physically available.

For example, in 2003 VISA's® base rate component for a CPS Retail CP transaction was about 1.39% versus 1.80% for a CPS Retail GNP transaction. MasterCard's® base rate component for a Domestic Merit CP transaction was 1.40% versus 1.90% for a Domestic MOTO [MOTO—Mail Order/Telephone Order] CNP transaction. See www.ose.state.ne.us/EPP/SunTrust.html.

Some transaction interchanges now support CNP-type transactions that have somewhat improved security over a conventional CNP transaction. For example, some interchanges have a transaction type that requires a remote purchaser not only to provide the account number and expiration date from the front of the card, but also some other information that is not from the front of the card. For example, there may be digits on the back of the card that the purchaser must provide to the merchant along with information from the front of the card. This means that the purchaser must have information from both the front of the card and the back of the card, presumably meaning that the purchaser has physical possession of the card. This can prevent fraudulent MOTO transactions based on credit card slips gathered from garbage cans outside restaurants, for example.

Such improved CNP-type transactions are still not as secure as a regular CP transaction. For example, a perpetrator of fraud may have a paper copy of the front and back of a credit card, or may have simply written down that information on a piece of paper while the cardholder was not minding his/her card. It has also been reported that the security code on the back of the card can sometimes be fraudulently recreated. Thus, like the conventional CNP transaction, such improved CNP transactions have the same basic security drawbacks to merchants, issuing banks, and transaction processors. Because of these security issues, such improved CNP-type transactions usually impose on the merchant elevated transaction fees charged by the interchange processor. The transaction fees for such improved CNP-type transactions tend to be lower than for the conventional CNP transaction, but they are still higher than for corresponding CP transactions. Thus, the significant cost and security issues of these CNP-type transactions remain significant drawbacks for merchants.

In general, the heavy cost burden to merchants for CNP transactions (of whatever type) is greatly aggravated in market sectors involving a high relative volume of CNP transactions compared to CP transactions. For example, the vast majority (believed to exceed 90%) of airlines reservations are made using CNP transactions. This means that the various airlines pay many millions of dollars out in elevated interchange fees as a result of CNP transactions. Similar burdens are shouldered by mail order companies, Internet-based companies, and other companies transacting a large portion of their business without meeting the customer at the time the transaction is undertaken. This is a significant problem.

Other problems and drawbacks also exist.

SUMMARY OF THE INVENTION

An embodiment of the present invention comprises a system and method for converting initial financial transactions into final financial transactions entailing lower transaction fees or which are otherwise more advantageous or efficient. According to one embodiment of the invention, a card not present (CNP) transaction is conducted for a remote (e.g., physically remote insofar the card can not be handed over at that time) consumer buying goods/services. When the consumer later arrives at a point of authentication (POA), the consumer is presented with an opportunity to have the CNP transaction effectively converted to a card present (CP) transaction using the same card instrument or a different card instrument. The merchant benefits because the transaction fees are less for the CP transaction compared to the CNP transaction. Additionally, there may be other benefits to the merchant, such as there being a lower risk of repudiation or a rejection of the charge. The consumer may benefit from rewards/rebates or other inducements provided in exchange for authorizing the subsequent transaction. The transaction processor may benefit from the increased efficiency and reduced risk of a card present transaction.

One preferred embodiment implements the invention in the airlines industry, wherein tickets ordered over the phone or on-line using a first CNP transaction are converted to a CP transaction upon the consumer swiping his/her card (which could be a credit card, a frequent flyer card, or other card carrying readable identification of the consumer) at an airport kiosk card reader device or at the airport check-in counter. Notably, airport kiosk devices are now widely deployed as security control mechanisms to authenticate the consumers in the automated issuance of boarding passes.

Accordingly, it is one object of the present invention to overcome one or more of the aforementioned and other limitations of existing systems and methods for payment processing.

It is another object or the invention to provide a system and method for reducing transaction fee costs for merchants accepting card instruments for payment.

It is another object of the invention to provide a system and method for converting higher cost CNP transactions to lower cost CP transactions.

It is another object of the invention to provide a system and method for incentivizing consumers to consent to converting higher cost card instrument transactions to lower cost card instrument transactions.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DETAILED DESCRIPTION OF THE INVENTION

Figure 1:
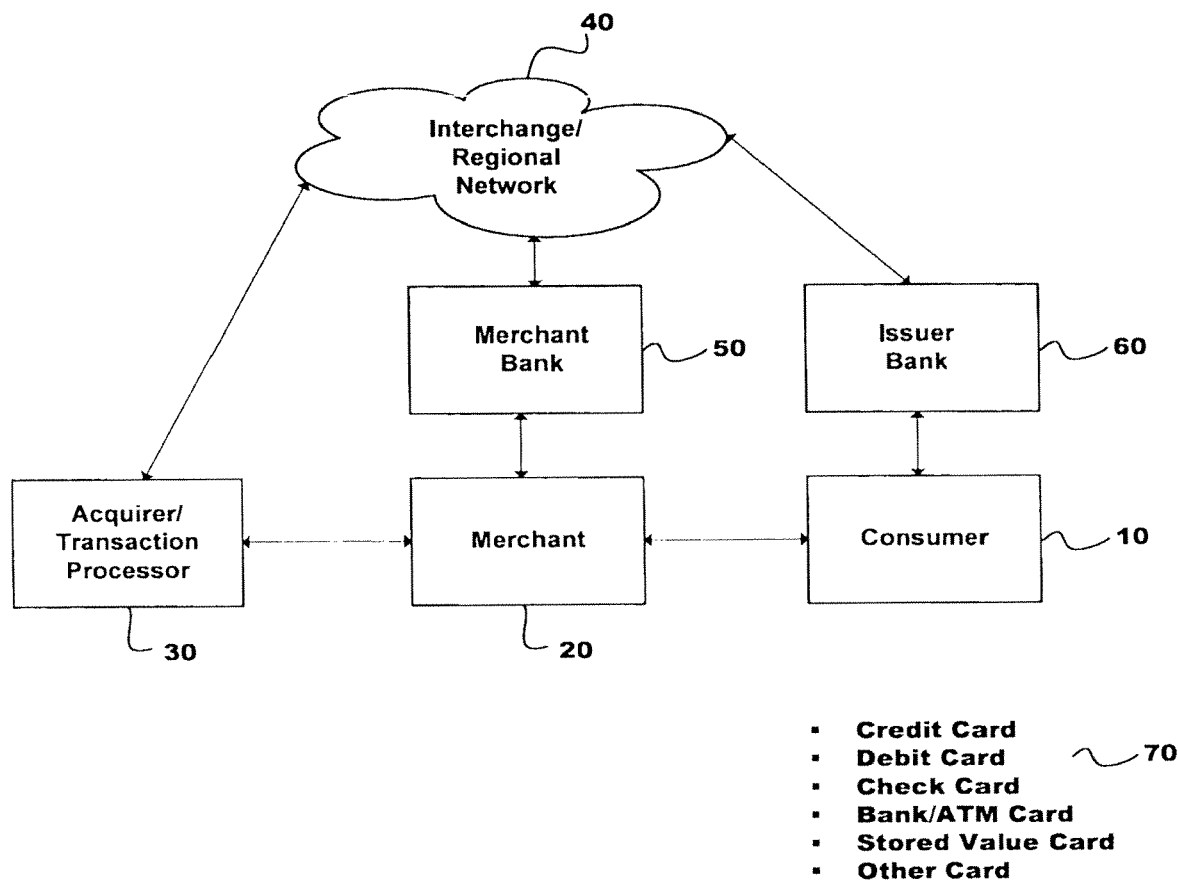
FIG. 1 is a block diagram of a card processing system for converting an initial card transaction to a final card transaction according to an embodiment of the invention.

FIG. 1 is a block diagram of a card processing system for converting an initial card transaction to a final card transaction according to an embodiment of the invention. Consumer 10 is a consumer (intended to encompass commercial buyers) purchasing goods or services. Consumer 10 may be a person initiating such purchases over the phone (home phone, car phone, or cell phone), through the mail, or over a computing device (personal computer, laptop, Palm™ type device, personal data assistant |PDA|, Personal Communication Service [PCS] device, etc.). Thus, consumer 10 may be communicating with merchant 20 over a telephonic network, the mail system, or a computer network such as the Internet or other public or private computer network.

Consumer 10 may be communicating with merchant 20 by interfacing with a live agent, a virtual agent, a Web site or other computer network presence, a interactive voice response (IVR) unit, a voice response unit (VRU), or any other suitable mechanism for consumer 10 to communicate with a remote merchant 20 in order to purchase goods or services in an initial transaction. For such initial transaction, consumer 10 is a consumer remotely located from merchant 20. For a later transaction relating to the conversion of the initial transaction to a final transaction, consumer 10 will be proximate to merchant 20, such as at a branch, store, or other locale or physical presence of merchant 20 representing a point of authentication (POA) where a second card payment instrument can be presented.

Merchant 20 is a merchant which receives orders or requests for goods/services and accepts card payment instruments for payment. Merchant 20 may comprise a live agent, virtual agent, Web site/other site, VRU, IVR. etc. as described above. Merchant 20 may include servers, databases, workstations, and appropriate software, for preparing and submitting for processing a first transaction using a first card payment instrument for a remote consumer 10. As described further in subsequent diagrams, the first card payment instrument transaction may be processed as a so-called card not present (CNP) transaction. Preparation and submission of the first transaction may be carried out using any suitable device, including a computer/workstation which submits such transactions automatically or based on an agent's input, a point-of-sale (POS) type device, and the like.

Merchant 20 is also adapted to present opportunities to the consumer for effectively converting a first card payment instrument transaction to a more favorable second card payment instrument transaction. As described further below, the second card payment transaction may be a so-called card present (CP) transaction when the card is physically presented by consumer 10 at a point of authentication (POA) where the card can be swiped or otherwise read by a card reader. PUS type device, and/or otherwise be made physically available for inspection. The PUS may include a card reader for reading magnetically-encoded cards, an RFID card reader for reading RFID-type cards/fobs, or other type of card reader device for reading information from a card (or fob or other portable device) that is representative of a card instrument. The second card payment instrument can be the same or a different card payment instrument from the first card payment instrument. Preparation and submission of the second transaction may be carried out using any suitable device, including a computer/workstation which submits such transactions automatically or based on an agent's input, a point-of-sale (POS) type device, and the like.

Accordingly, merchant 20 may include a presentation device, such as a display, monitor, screen, or the like, for presenting an offer to consumer 10 to convert a first card payment instrument transaction to a more favorable second card payment instrument transaction. The presentation may include video and/or audio information. The presentation can be made in various fashions. For example, the presentation can be a purely graphical presentation made on a specialized terminal maintained by the merchant, such as a kiosk device or other dedicated terminal. The presentation can be made on a suitably programmed general purpose computer terminal that is connected to the Internet or like public network, or even a private network, wherein the presentation can be made as a so-called web page or similar page.

The presentation can be made on a display (e.g., page) that is dedicated to the presentation, or can be integrated onto a page that includes other information. For example, following the consumer swiping his/her card, a page may be presented that states: "Your reservation for a Ford® Taurus™ for three (3) days from Oct. 26-Oct. 28, 2004 is confirmed and your car is in Lot B, Spot 125. Elsewhere, the page may also provide an offer for converting the initial transaction as per the present invention: "If you will agree to allow us convert the original credit card transaction for this reservation into a transaction for the same amount on the same card or a different card, we can award you 500 driver miles. If so, press 'yes' and swipe the card you wish to use."

Of course, the presentation may be made on its own dedicated display or page.

Other variations are possible. For example, the presentation can be made as a so-called banner ad or pop-up ad.

In yet another variation of the invention, the presentation may be made on a computing device that is not necessarily maintained by the merchant. For example, the presentation may be made on a computer equipped with a card reader device that is maintained by the consumer or some other non-merchant individual or entity. For example, the consumer may initiate the initial CNP transaction by contacting the merchant over the Internet using the consumer's computer. During the course of that session, the merchant's web site will ask "Is your computer equipped with or do you have access to a card reader device." The consumer responds in the negative, and a CNP transaction is undertaken. Later, when the consumer visits another party with a computing device equipped with a card reader, the consumer can access the merchant's web site, view a presentation with the offer, and swipe his/her card through the card reader to initiate the conversion of the previous CNP transaction to a CP transaction.

Of course, the conversion offer can be articulated in many fashions, which may or may not reference "conversion" so long as the effect of the offer, if accepted, is to carry out such a conversion. The offer presented may include an offer of a reward or rebate as an inducement for the consumer 10 to authorize or otherwise agree to the conversion.

Accordingly, merchant 20 may include a card reader device for reading a second card payment instrument presented by the consumer 10 at the POA. The card reader device can be any device for reading cards, including a card reader, POS device, ATM reader, and the like. Alternatively, merchant 20 may include an agent who can type in or otherwise enter an account number as read from the card.

According to one embodiment, the card reader device and the presentation device for presenting the offer are preferably integrated together, such as in a computer workstation or kiosk.

As can be readily appreciated, the various aspects of merchant 20 need not be, and preferably are not, collocated. Just by way of example, merchant 20 may include some elements (a live agent, virtual agent, Web site/other site, VRU, IVR, etc.) at a first site for receiving phone/mail/Internet orders corresponding to the first card payment transaction (e.g. for a CNP type transaction), whereas elements at a POA for initiating the transaction conversion corresponding to the second card payment transaction (e.g., for a CP type transaction) are located at a second site at an airport, retail outlet, or other POA).

It is to be understood that as discussed herein the term "conversion" is to be broadly construed to cover any techniques for effectively converting, transforming, translating, or modifying a first financial transaction into a second Financial transaction. Therefore, conversion is intended to include canceling or reversing the first transaction followed by submitting the second transaction, converting a "provisional" (discussed further below) first transaction to a final transaction, and any other approach for effectively negating, nullifying, ignoring, removing, or modifying the first transaction (or aspects or portions of the first transaction, such as its transaction fee) and implementing the desired second transaction (which may be an entirely new transaction, which may be a modified first transaction, which may be a converted first transaction, etc.). Converting the first transaction, as described herein, could be effectuated by issuing a rebate or credit against the transaction fees that are charged against the first transaction, as discussed below for FIG. 4.

Issuer bank 60 is a bank or other financial institution which is the issuer of one or more card payment instruments held by consumer 10. Issuer bank 60 and consumer 10 can communicate in various fashions, including by phone (live agent, virtual agent, IVR/VRU), computer/PCS/PDA (Internet or other networked connection, public or private), mail, and so forth. Cards issued to consumer 10 may include any of a variety of cards, including a credit card (general use or private label), debit card, check card, bank card, ATM card, stored value card, or other card, as reflected at 70 of FIG. 1. Some cards may not be issued by a bank per se, such as certain stored value cards or private label cards, in which case it is understood that issuer bank 60 encompasses whatever institution or entity that issued the card.

Typically, the issuer (or an agent acting on its behalf) will also be the entity which receives and approves/declines various transactions against the card discussed herein, such as charges, debits, funds holds, transfers, balance/limit/funds available checks, and the like. For simplicity, FIG. 1 shows a single issuer bank 60 as representing the entity that issues the card and which processes transactions against the card, although it is to be understood that separate entities could easily carry out those operations.

Merchant bank 50 is a merchant bank or sponsoring bank which maintains a merchant account on behalf of merchant 20, as well understood in this field. While FIG. 1 illustrates the typical case for purposes of clarity, it is to be understood that merchant bank 50 does not necessarily have to be a banking/financial institution separate from merchant 20. Some large merchants 20 could establish and maintain their own financial accounts.

Acquirer/transaction processor 30 is a transaction processor for receiving and routing financial transactions on behalf of merchant 20. Just by way of a nonlimiting example, acquirer/transaction processor 30 may route credit transactions through the credit networks (e.g., VISA® or MasterCard® interchanges), bank transactions through regional networks (e.g., EFT or ATM networks), stored value transactions through their appropriate communication channels, and so forth. According to the invention, there may be one or more than one acquirer/transaction processor 30, as needed. In some cases, certain large merchants 20 may not need the services of a separate acquirer/transaction processor 30. For some transactions, such as a stored value transaction for a stored value processing system maintained by the merchant 20, routing and processing may be carried out using infrastructure internal to merchant 20.

Interchange/regional network 40 represents any interchanges, regional networks, or other networks through which transactions are routed. Transactions may include any transactions appropriate for the card instrument, and used for implementing the invention, including any authorization transaction, deposit transaction, reversal/cancellation transaction, provisional transaction, provisional conversion transaction, balance/limit/funds available checks, and so forth.

Figure 2:
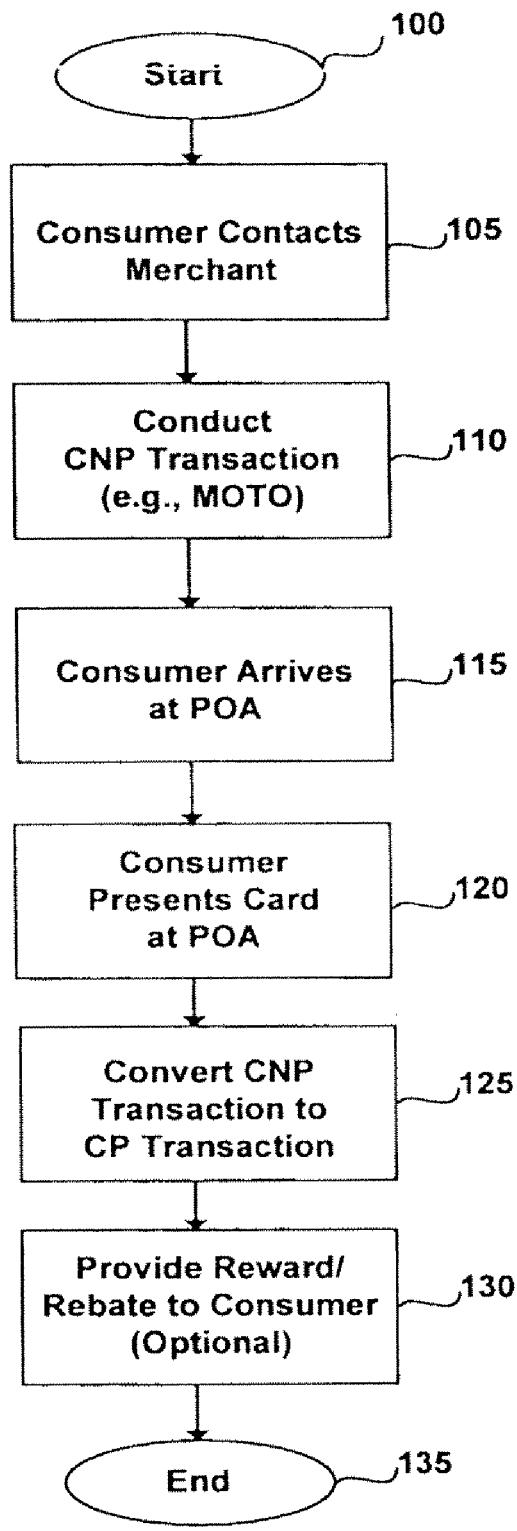
FIG. 2 is a flow chart of a method for converting an initial CNP transaction to a CP transaction according to an embodiment of the invention.

FIG. 2 is a flow chart of a method for converting an initial CNP transaction to a CP transaction according to an embodiment of the invention. The method starts at 100, and a remote consumer contacts a merchant at 105 in order to purchase goods or services. For example, the consumer's personal computer may contact the merchant at the merchant's point-of-presence on the Internet.

At 110, an initial transaction, such as a CNP transaction, is conducted for selected items (goods or services, e.g., an airlines ticket) using a first card payment instrument or using accounts/cards already on file with the merchant. For example, the merchant may submit a CNP transaction based on the consumer's credit card account to be processed through a transaction processor/interchange to the consumer's issuing bank.

Where the initial transaction is a CNP transaction, it may comprise any of the various CNP transactions that may be supported for the first card payment instrument. For example, if the first card payment instrument is a general purpose credit card, the initial transaction could be a conventional CNP transaction where an account number and expiration date is provided. The initial transaction could be an improved CNP transaction where other security-enhancing information is included, such as information from the back of the card. Such improved CNP transactions are well known in the art, such as, for example, the VISA® CVV (Card Verification Value) based CNP transaction or the MasterCard® CVC (Card Verification Code) based CNP transaction. Yet other types of CNP transactions may be used for the first transaction, such as transactions where the address of record of the cardholder is included as yet another security enhancement for an otherwise CNP transaction.

At 115, the consumer arrives at a POA of the merchant, and at 120 the consumer presents or makes available for inspection a second card payment instrument. According to the invention, the second card payment instrument may be the same as or different from the first card payment instrument. For example, the consumer may arrive at a merchant branch and present the same credit card as previously used for a CNP transaction, or the consumer may present a completely different card. In either case, the card is physically present.

At 125, the initial CNP transaction is converted to a CP transaction. The conversion may follow an offer presented to the consumer for the conversion and the consumer's authorization or acceptance of the offer. The offer may include a rebate, reward, or other incentive to be provided to the consumer in exchange for accepting the offer. For example, the oiler may be provided via a computer screen or display which indicates that the consumer's agreement to convert the transaction will result in 1000 frequent flyer miles to the consumer's frequent flyer account; 5% off on the next purchase with that merchant; 1% off on the existing purchase; and so forth. The variations in the incentive that may be provided to the consumer are endless, but the common theme is that such a consumer incentive may be employed in order to share the efficiency benefits that accrue when lower cost, more secure, transactions are used to replace the initial transaction.

Figure 4:
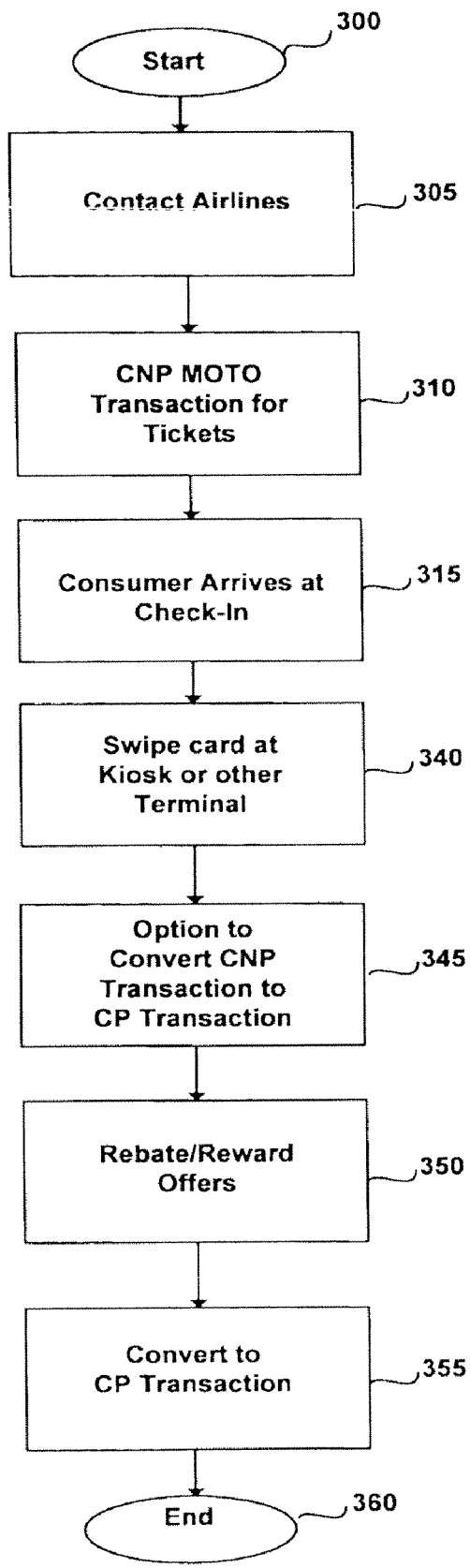
FIG. 4 is a flow diagram of a method for converting a CNP transaction to a CP transaction at an airport according to an embodiment of the invention.

The conversion of the CNP transaction to the CP transaction at 125 can be implemented in numerous fashions, examples of which are provided for FIG. 4 below. It should be appreciated that the examples provided in FIG. 4 are merely exemplary, and the scope and spirit of the invention clearly encompasses other variations for converting first transactions to more efficient second transactions as broadly described herein.

At 130, the optional rebate/reward/incentive is provided to the consumer. For example, the rebate/reward/incentive could include frequent flyer miles, rental car miles, a discount, an upgrade, or any other incentive. The method ends at 135.

Figure 3:
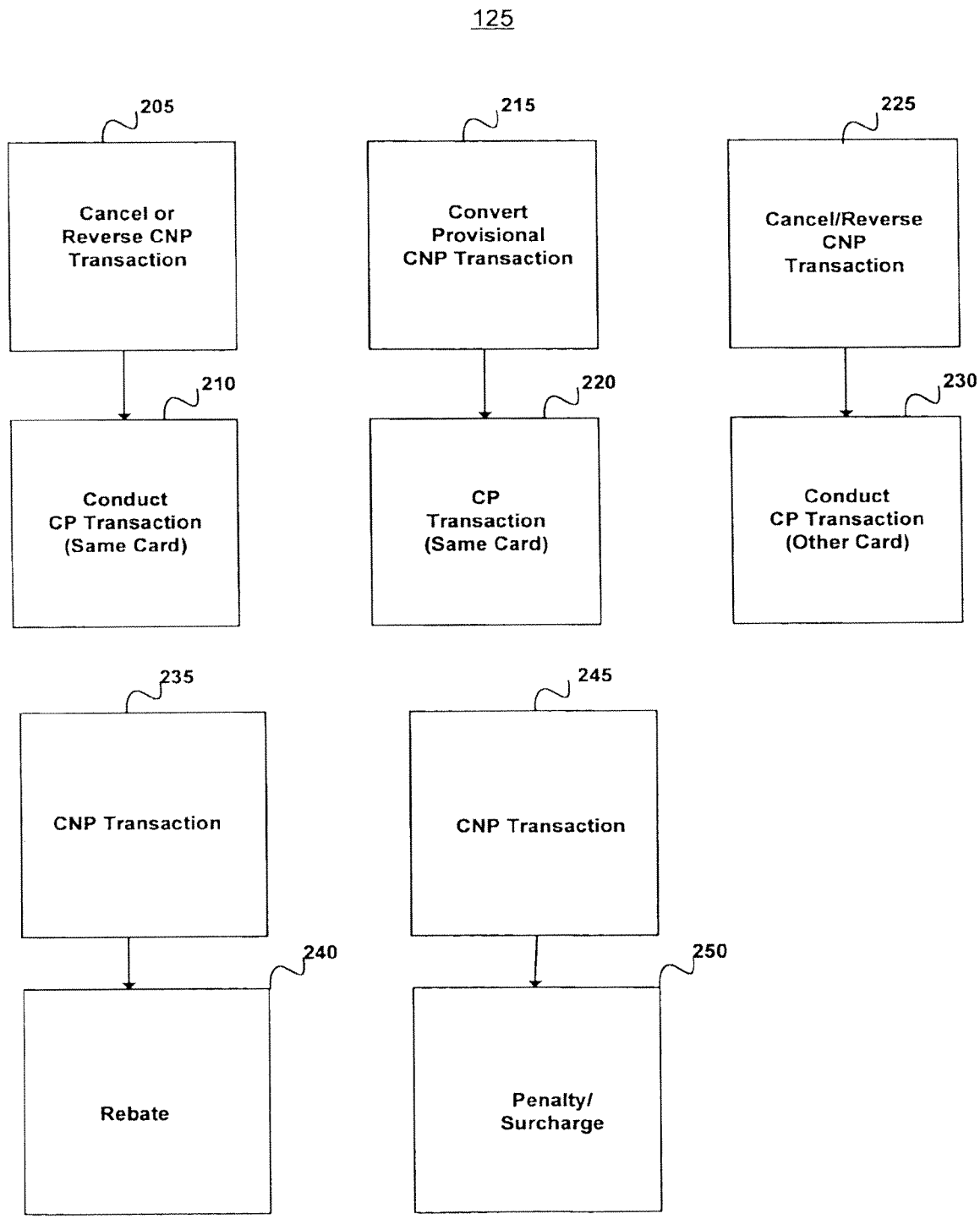
FIG. 3 is a block diagram of several alternative approaches for converting a CNP transaction to a CP transaction according to yet other embodiments of the invention.

FIG. 3 is a block diagram of several alternative approaches 125 for converting a CNP transaction to a CP transaction according to yet other embodiments of the invention. According to one approach, at 205 the first CNP transaction on the first card payment instrument is canceled or otherwise reversed, and at 210 a second CP transaction on the first card payment instrument is conducted.

Just by way of example, the first transaction may have been submitted on a credit card account 1234 4321 1342 4231 as a CNP transaction subject to a 1.9% transaction lee. If the purchase was for a $1000 airline ticket, the merchant (airlines) would pay a $19 transaction fee. By in effect canceling or reversing or revising that transaction (as is well understood in the art) and submitting a second transaction on that same credit card account 1234 4321 1342 4231 as a CP transaction subject to a 1.4% transaction fee, the merchant is charged only a $14 transaction fee. The reduction in the transaction lee, more than 25%, is a significant reduction in cost that benefits the merchant and which can be shared with others, including the consumer purchaser.

In another approach beginning at 215, the first transaction was conducted as a so-called "provisional CNP transaction." A provisional CNP transaction is a CNP transaction which is understood or intended to be subject to a subsequent conversion upon presentment of the card at a POA. For example, depending on the implementation, a provisional CNP transaction might provide the merchant 20 with a certain period of time for converting the provisional CNP transaction to a CP transaction, such as 7 days, 14 days, etc. Or the provisional transaction could be understood as being subject to conversion prior to some event, such as prior to the consumer checking in/boarding an aircraft or taking delivery of goods or services. According to one approach, if not converted, the provisional CNP transaction would stand as a CNP transaction with applicable transaction fee rates applied thereto. According to another approach, additional fees or costs may be imposed when the conversion is not completed. These additional fees or costs are imposed on the merchant, although, some portion or all could be passed on to the consumer in order to encourage the consumer to carry out the acts needed for conversion. Other approaches to a provisional CNP transaction could easily be implemented without departing from the spirit and scope of the present invention. With that background, at 215 the provisional CNP transaction is converted and at 220 the result is a CP transaction for the same card.

According to one approach, a provisional CNP transaction could be implemented as a so-called "Card Not Yet Present" (CNYP) transaction. Under such a CNYP transaction, at the time of purchase or reservation it would be understood that the consumer would be able to present the card prior to completion of the transaction. This would avoid the need for canceling or reinitiating the initial transaction. This approach may be particularly beneficial for transactions where the consumer must ultimately be present to complete the transaction, e.g., to pick up the ticket and board the airplane, to check in at the hotel, to pick up the rental car, and so forth.

According to yet another approach, a so-called "Psuedo Card Holder Present" (PCHP) transaction would represent a middle ground between a CP and a typical CNP transaction. For a PCHP transaction, like a CNP transaction, the merchant is not initially presented with a physical card because the consumer is remotely located from the merchant. However, a secondary authentication mechanism could be used to prove that the cardholder corresponds to the consumer who is remotely contacting the merchant for the transaction. For example, any of the various sorts of personal identification information often used for security purposes could be employed, such as mother's maiden name, a PIN or other personal code, an alias, a phone number (e.g. through the use of ANI), social security number, and the like. Other means for authenticating the consumer could be used, such as a cookie stored on the person's computer, mobile phone browser, key fob, MD tag, etc. Additionally, where the merchant has an affinity program, such as a frequent flyer program, the merchant could link the use the affinity program's card as proof that the cardholder was present for a PCHP transaction.

Such a PCHP transaction might be afforded a lower transaction fee by the processing networks. Such as PCHP transaction might be subject to the consumer later presenting the card at a POA.

Another approach to transaction conversion is to cancel/reverse the CNP transaction for a first card payment instrument at 225, and to conduct a CP transaction on a different second card payment instrument at 230, as depicted in FIG. 3. Canceling/reversing the first CNP transaction is intended to be understand as encompassing any formal mechanism recognized by the transaction network for canceling/reversing a transaction, as well as any other fashion to effectively accomplish the result of canceling/reversing the transaction. The second card payment instrument may include any of the cards discussed in conjunction with FIG. 1. It is to be understood, as well, that a CP transaction is intended to include transactions for cards capable of both CP and CNP transactions (e.g., general use credit cards), as well as cards capable only of CP type transactions (e.g., on-line PIN type debit cards).

Yet another approach for effectively converting a CNP transaction to a CP transaction is depicted in FIG. 3 at blocks 235-240. At 235, an initial CNP transaction is undertaken. At 240, once the cardholder has presented the card instrument at a POA, a rebate on the CNP transaction fee is provided back to the merchant. Therefore, the initial CNP transaction is not actually reversed or negated; rather, the merchant is paid a rebate on the transaction fee that was to be deducted (or already has been deducted) from the net payment to the merchant. Alternatively, if the merchant had not yet received a net payment reflecting the elevated CNP transaction fee deduction, the merchant can simply be provided a net payment reflecting a transaction fee with the rebate applied thereto. The rebate discussed above could be a full rebate that effectively makes up for the difference between a CNP transaction fee and a CP transaction fee, or could be something less than the difference. In fact, the value of the rebate could actually exceed the difference in order to encourage the merchant to begin practicing the transaction conversion process described herein.

The person of ordinary skill in the field will readily appreciate that the issuance of a rebate or credit to the merchant in order to effectively convert the CNP transaction can be implemented in various fashions. The rebate could be issued on a per-transaction basis or it could be issued on a volume basis. The rebate could be issued based on the merchant satisfying certain thresholds. For example, the rebate could be issued based on the merchant having some percent of the initial CNP transactions (e.g., 25% of all CPN transactions) validated by the cardholder later presenting the card at a POA.

Yet another approach for effectively converting a CNP transaction to a CP transaction is depicted in FIG. 3 at blocks 245-250. At 245, an initial CNP transaction is undertaken; however, this CNP transaction is undertaken with a fee that more closely approximates (or equates) the transaction fee for a CP transaction. However, if the merchant fails to authenticate the card instrument at a POA, as discussed elsewhere herein, the merchant may be subjected to a penalty or surcharge to account for the higher risk.

In yet another variation (not shown), the approaches for blocks 235-240 and 245-250 could effectively be combined, i.e., following the initial CNP transaction, the merchant which has the consumer present the card at a POA will receive a rebate or reward, whereas the merchant who does not successfully provide for card presentment will suffer a penalty/surcharge.

FIG. 4 is a flow diagram of a method for converting a CNP transaction to a CP transaction at an airport according to another embodiment of the invention. Preferably, the POA for initiating the conversion takes place at, an airport kiosk. These airport kiosk devices are now widely deployed as security control mechanisms to authenticate the consumers in the automated issuance of boarding passes.

The method starts at 300, and an airlines is contacted at 305. A CNP transaction for a first card payment instrument is conducted at 310 for purchasing tickets or acquiring other goods/services from the airlines. Information of the first card payment instrument may be provided by the consumer at that time, or may be retrieved by the airlines from previously stored data files. For example, the consumer may provide his/her credit card information over a secure link on the Internet to the airlines' web site, over the phone to a live agent, or over the phone to an IVR/VRU device.

At 315, the consumer arrives at the airport (e.g., a gate or terminal or check-in location), and at 340 a second card payment instrument is swiped or read at a kiosk or other card reader device. The consumer is presented with an option (offer) to convert the initial CNP transaction to a CP transaction at 345. At 350, rebates/rewards or other incentives may be offered as an incentive to accepting the offer. At 355 the initial CNP transaction on the first card payment instrument is converted to a CP transaction on the second card payment instrument. The first and second card payment instruments may be the same or different. The method ends at 360.

In FIG. 4, steps 315 through 355 can be implemented in various fashions easily comprehended by the person of ordinary skill in this field and within the spirit and scope of the invention. For example, the merchant (here, an airline) may provide a presentation device and a card reader device. Preferably, the presentation device and card reader device are integrated, such as in a kiosk or similar consumer friendly terminal. The card reader device allows the consumer to swipe a card which can be read in order to identify the cardholder. Based on the identity of the cardholder, a database can be read to identify if the cardholder made an initial purchase based on a CNP type transaction. If so, the presentation device can present the offer that the initial CNP type transaction be converted to another transaction. The development of computer code to search a database of purchase transactions and to generate display screens with offers is well understood and well within the skill of the ordinary artisan.

Several examples are helpful in appreciating the breadth in which the invention can be implemented. For example, assume the initial transaction was for a $1000 airline ticket made as a CNP transaction on a 1234 4321 1342 4231 VISA credit card account subject to a 1.9% base rate transaction Ice. The consumer arrives at the airport check-in kiosk and swipes a card through the card reader. Preferably, the consumer swipes that same 1234 4321 1342 4231 VISA credit card, however, virtually any card instrument that has encoded information of the purchaser's identity can be used in order to look up the initial transaction (e.g., some other credit card, a bank card, etc.).

Based on the card that is swiped by the consumer, the card reader processing apparatus causes a search of the database to be conducted which indicates that the initial purchase was a CNP purchase. As a result, the display apparatus may present to the consumer one or more options for converting that initial transaction, such as:

"If you authorize us to re-run the transaction on your 1234 4321 1342 4231 VISA credit card for the same amount of $1000, we can award you 1000 frequent flyer miles on your frequent flyer account. Please press 'yes' and swipe your 1234 4321 1342 4231 VISA credit card."

"If you authorize us to cancel the transaction on your 1234 4321 1342 4231 VISA credit card for $1000 and run that transaction for the same amount on your ATM/debit card, we can award you 1500 frequent flyer miles on your frequent flyer account. Please press 'yes' and swipe your ATM/debit card."

"If you authorize us to cancel the transaction on your 1234 4321 1342 4231 VISA credit card for $1000 and run that transaction for the same amount on your stored value card, we can award you 1500 Frequent Flyer miles on your Frequent Flyer account. Please press 'yes' and swipe your stored value card."

The above scenario represents just an example of how the invention might be implemented, and it is to be understood that other variations are within the scope and spirit of the invention. For example, different types of incentives could be offered to the consumer, or no particular incentive may be offered at all. According to yet another approach, the incentives provided to consumer can be adjusted based on the desirability of the transactions to the merchant. Just by way of example, suppose that the merchant's order of preference for transactions is (1) ATB/debit card transactions, (2) credit card transactions and (3) stored value card transactions. Accordingly, the merchant could provide the greatest level of incentives 1 hr (1), a lesser incentive for (2), and yet a further lesser incentive for (3). The merchant's preference may be based on the cost of the transactions (thus encourage the transactions with lower transaction fees), based on security considerations (thus encourage transactions viewed as most secure), or on any other consideration important to the merchant.

Figure 5:
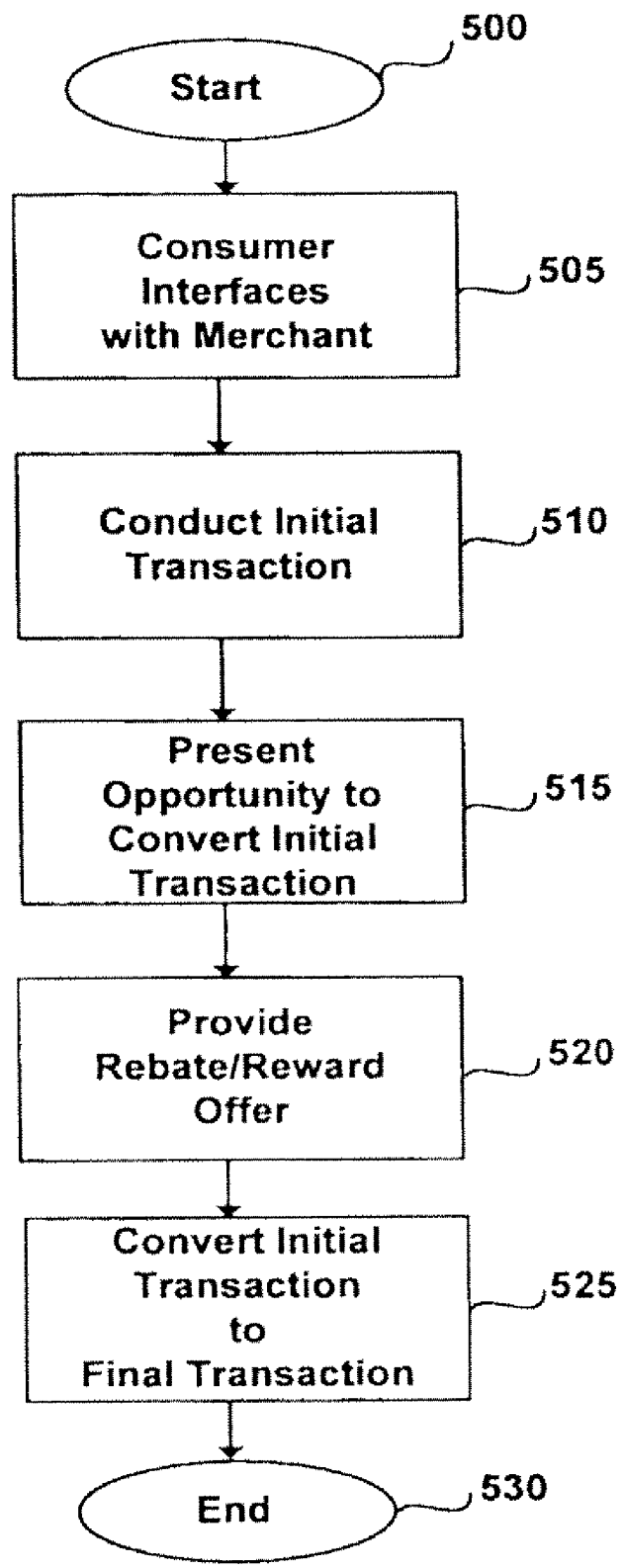
FIG. 5 is a flow diagram of a method for converting an initial transaction type to a final transaction type according to yet another embodiment of the invention.

FIG. 5 is a flow diagram of a method for Converting an initial transaction to a final transaction according to yet another embodiment of the invention. The method starts at 500, and a consumer interfaces with a merchant at 505. An initial transaction is conducted at 510. The initial transaction may be a CNP or CP transaction using a first card payment instrument. At 515, the consumer is presented with an opportunity (offer) to convert the initial transaction to a final transaction. At 520, an offer for a rebate/reward/incentive may be provided. At 525 the initial transaction is converted into the final transaction.

According to FIG. 5, the initial transaction and final transaction may be different types of transactions for the same card payment instrument (e.g., a first CNP transaction and a second CP transaction for the same card); different types of transactions on different card payment instruments (e.g., a first CNP transaction on a first card and a second CP transaction for a second, different, card); similar or identical types of transactions on different card payment instruments (e.g., a first CNP transaction on a first card and a second CP transaction for a second, different, card; a first CP or CNP transaction on a first card and a second CP transaction for a second, different, card, etc.). Preferably, the final transaction is one which is less costly or otherwise more advantageous to one or more parties illustrated in FIG. 1. For example, merchants may prefer bank card type (e.g., ATM card) transactions over credit transactions. Therefore, the consumer may be induced to convert a first credit card transaction (CP or CNP) to a second transaction on the bank card because of the reduced transaction fees on the latter.

According to yet another embodiment, the final transaction need not be a card instrument based transaction. For example, the final transaction could be a cash transaction, check transaction, RFID transaction, or other type of transaction which is more advantageous to the merchant and/or consumer than the initial transaction.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A computer implemented method for converting an initial financial transaction to a final financial transaction, the computer comprising a processor and a memory, the method comprising:
   receiving at an airlines a contact from a remote consumer;
   conducting a card not present (CNP) transaction for a first card instrument with the airlines for services;
   providing a card terminal reader at a point of authentication (POA) device at the airlines for enabling the consumer to swipe a second card instrument;
   receiving an authorization from the consumer at the POA device for a conversion of the CNP transaction on the first card instrument to a card present (CP) transaction on the second card instrument; and
   the processor converting the CNP transaction on the first card instrument to a CP transaction on the second card instrument.

2. The computer implemented method of claim 1, wherein the card terminal reader comprises a kiosk at the airport.

3. The computer implemented method of claim 1, further comprising providing a reward or rebate as a result of authorizing the conversion.

4. The computer implemented method of claim 3, wherein the reward or rebate comprises frequent flyer miles.

5. The computer implemented method of claim 1, wherein the reward or rebate varies depending on a type of the second card instrument.

6. The computer implemented method of claim 1, wherein the first card instrument and second card instrument are the same.

7. A computer implemented method for converting an initial financial transaction to a final financial transaction, the computer comprising a processor and a memory, the method comprising:
   receiving at an airlines a contact from a remote consumer, wherein the contact comprises a telephone call or an on-line order;
   conducting a card not present (CNP) transaction for a first card instrument with the airlines for services, wherein the services comprises ordering plane tickets;
   providing a card terminal reader at a point of authentication (POA) device at the airlines for enabling the consumer to swipe a second card instrument, wherein the card terminal reader comprises a kiosk at the airport;
   receiving an authorization from the consumer at the POA device for a conversion of the CNP transaction on the first card instrument to a card present (CP) transaction on the second card instrument;
   providing a reward or rebate as a result of authorizing the conversion, wherein the reward or rebate comprises frequent flyer miles and is based on a type of the second card instrument; and
   the processor converting the CNP transaction on the first card instrument to a CP transaction on the second card instrument,
   wherein the first card instrument and second card instrument are selected from a group consisting of a credit card, bank card and stored value card.

\* \* \* \* \*